United States Patent
Rocznik et al.

(10) Patent No.: US 10,006,810 B2
(45) Date of Patent: Jun. 26, 2018

(54) METHOD TO MODULATE THE SENSITIVITY OF A BOLOMETER VIA NEGATIVE INTERFERENCE

(71) Applicant: Robert Bosch GmbH, Stuttgart (DE)

(72) Inventors: Thomas Rocznik, Mountain View, CA (US); Fabian Purkl, Rutesheim (DE); Gary O'Brien, Menlo Park, CA (US); Ando Feyh, Reutlingen (DE); Bongsang Kim, Mountain View, CA (US); Ashwin Samarao, Sunnyvale, CA (US); Gary Yama, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days. days.

(21) Appl. No.: 15/516,821

(22) PCT Filed: Oct. 9, 2015

(86) PCT No.: PCT/US2015/054855
§ 371 (c)(1),
(2) Date: Apr. 4, 2017

(87) PCT Pub. No.: WO2016/057880
PCT Pub. Date: Apr. 14, 2016

(65) Prior Publication Data
US 2017/0314995 A1  Nov. 2, 2017

Related U.S. Application Data

(60) Provisional application No. 62/062,436, filed on Oct. 10, 2014.

(51) Int. Cl.
*G01J 5/20* (2006.01)
*G01J 5/06* (2006.01)
(Continued)

(52) U.S. Cl.
CPC ............... *G01J 5/06* (2013.01); *G01J 5/0809* (2013.01); *G01J 5/0853* (2013.01); *G01J 5/24* (2013.01);
(Continued)

(58) Field of Classification Search
CPC .......... G01J 5/06; G01J 5/0809; G01J 5/0853; G01J 5/24
(Continued)

(56) References Cited

U.S. PATENT DOCUMENTS 6,836,678 B2 *  12/2004  Tu ..................... A61B 5/14532
                                                        600/310
7,262,413 B2    8/2007  Kauffman et al.
(Continued)

FOREIGN PATENT DOCUMENTS

JP    2009-538425 A    11/2009

OTHER PUBLICATIONS

International Search Report and Written Opinion for PCT(US2015/054855 dated Jan. 26, 2016 (11 pages).

*Primary Examiner* — David Porta
*Assistant Examiner* — Meenakshi Sahu
(74) *Attorney, Agent, or Firm* — Maginot Moore & Beck LLP (57) ABSTRACT

A semiconductor sensor system, in particular a bolometer, includes a substrate, an electrode supported by the substrate, an absorber spaced apart from the substrate, a voltage source, and a current source. The electrode can include a mirror, or the system may include a mirror separate from the electrode. Radiation absorption efficiency of the absorber is based on a minimum gap distance between the absorber and mirror. The current source applies a DC current across the absorber structure to produce a signal indicative of radiation absorbed by the absorber structure. The voltage source
(Continued)

powers the electrode to produce a modulated electrostatic field acting on the absorber to modulate the minimum gap distance. The electrostatic field includes a DC component to adjust the absorption efficiency, and an AC component that cyclically drives the absorber to negatively interfere with noise in the signal.

15 Claims, 3 Drawing Sheets (51) Int. Cl.
  *G01J 5/08* (2006.01)
  *G01J 5/24* (2006.01)
(52) U.S. Cl.
  CPC ... *G01J 2005/066* (2013.01); *G01J 2005/067* (2013.01)
(58) Field of Classification Search
  USPC ..................................................... 250/338.4
  See application file for complete search history.

(56) References Cited

U.S. PATENT DOCUMENTS

| | | | |
|---|---|---|---|
| 7,378,655 B2* | 5/2008 | Tai ........................... | G01J 3/26 250/338.1 |
| 7,968,846 B2* | 6/2011 | Talghader ................. | G01J 3/26 250/338.1 |
| 2011/0057107 A1 | 3/2011 | Agnese et al. | |

\* cited by examiner

METHOD TO MODULATE THE SENSITIVITY OF A BOLOMETER VIA NEGATIVE INTERFERENCE

RELATED APPLICATION

This application is a 35 U.S.C. § 371 National Stage Application of PCT/US2015/054855, entitled "METHOD TO MODULATE THE SENSITIVITY OF A BOLOMETER VIA NEGATIVE INTERFERENCE" by Rocznik et al., filed Oct. 9, 2015, which claims the benefit of priority to U.S. Provisional Application No. 62/062,436 filed on Oct. 10, 2014, entitled "METHOD TO MODULATE THE SENSITIVITY OF A BOLOMETER VIA NEGATIVE INTERFERENCE," the disclosures of which are incorporated by reference herein in their entirety.

TECHNICAL FIELD

This disclosure relates generally to sensors and, more particularly, to bolometers.

BACKGROUND

Objects at any non-zero temperature radiate electromagnetic energy which can be described either as electromagnetic waves or photons, according to the laws known as Planck's law of radiation, the Stefan-Boltzmann Law, and Wien's displacement law. Wien's displacement law states that the wavelength at which an object radiates the most ($\lambda$max) is inversely proportional to the temperature of the object as approximated by the following equation:

$$\lambda_{max}(\mu m) \approx \frac{3000}{T(K)}$$

Hence for objects having a temperature close to room temperature, most of the emitted electromagnetic radiation lies within in the infrared region. Due to the presence of $CO_2$, $H_2O$, and other gasses and materials, the earth's atmosphere absorbs electromagnetic radiation having particular wavelengths. Measurements have shown, however, that there are "atmospheric windows" where such absorption is minimal. An example of such a "window" is the 8 µm-12 µm wavelength range. Another window occurs at the wavelength range of 3 µm-5 µm. Typically, objects having a temperature close to room temperature emit radiation close to 10 µm in wavelength. Therefore, electromagnetic radiation emitted by objects close to room temperature is only minimally absorbed by the earth's atmosphere. Accordingly, detection of the presence of objects which are either warmer or cooler than ambient room temperature is readily accomplished by using a detector capable of measuring electromagnetic radiation emitted by such objects.

One commonly used application of electromagnetic radiation detectors is for automatically energizing garage door lights when a person or car approaches. Another application is thermal imaging. In thermal imaging, which may be used in night-vision systems for driver assistance, the electromagnetic radiation coming from a scene is focused onto an array of detectors. Thermal imaging is distinct from techniques which use photomultipliers to amplify any amount of existing faint visible light, or which use near infrared (~1 µm wavelength) illumination and near-infrared cameras.

Two types of electromagnetic radiation detectors are "photon detectors" and "thermal detectors". Photon detectors detect incident photons by using the energy of said photons to excite charge carriers in a material. The excitation of the material is then detected electronically. Thermal detectors also detect photons. Thermal detectors, however, use the energy of said photons to increase the temperature of a component. By measuring the change in temperature, the intensity of the photons producing the change in temperature can be determined.

In thermal detectors, the temperature change caused by incoming photons can be measured using temperature-dependent resistors (thermistors), the pyroelectric effect, the thermoelectric effect, gas expansion, and other approaches. One advantage of thermal detectors, particularly for long wavelength infrared detection, is that, unlike photon detectors, thermal detectors do not require cryogenic cooling in order to realize an acceptable level of performance.

One type of thermal sensor is known as a "bolometer." Even though the etymology of the word "Bolometer" covers any device used to measure radiation, bolometers are generally understood to be to thermal detectors which rely on a thermistor to detect radiation in the long wavelength infrared window (8 µm-12 µm) or mid-wavelength infrared window (3 µm-5 µm).

Because bolometers must first absorb incident electromagnetic radiation to induce a change in temperature, the efficiency of the absorber in a bolometer relates to the sensitivity and accuracy of the bolometer. Ideally, absorption as close to 100% of incident electromagnetic radiation is desired. In theory, a metal film having a sheet resistance (in Ohms per square meter) equal to the characteristic impedance of free space, laying over a dielectric or vacuum gap of optical thickness d will have an absorption coefficient of 100% for electromagnetic radiation of wavelength 4d. The following equation shows the expression of the characteristic impedance (Y) of free space:

$$Y = \sqrt{\frac{\mu_0}{\varepsilon_0}}$$

wherein $\varepsilon_0$ is the vacuum permittivity and $\mu_0$ is the vacuum permeability.

The numerical value of the characteristic impedance of free space is close to 377 Ohm. The optical height of the gap is defined as "n×d", where n is the index of refraction of the dielectric, air or vacuum in the gap.

In the past, micro-electromechanical systems (MEMS) have proven to be effective solutions in various applications due to the sensitivity, spatial and temporal resolutions, and lower power requirements exhibited by MEMS devices. One such application is as a bolometer. Known bolometers use a supporting material which serves as an absorber and as a mechanical support. Typically, the support material is silicon nitride. A thermally sensitive film is formed on the absorber to be used as a thermistor. The absorber structure with the attached thermistor is anchored to a substrate through suspension legs having high thermal resistance in order for the incident electromagnetic radiation to produce a large increase of temperature on the sensor.

A temperature change of an absorber of a bolometer due to absorption of incident radiation is associated with a change in resistance of a thermistors material of the absorber. By measuring an output voltage resulting from applying a probe current across the absorber, the change in resistance in the absorber is determined. Using the correspondence between the change in resistance and the change in temperature of the absorber, the change in resistance of the absorber is used to make an inference about the incident radiation.

Figure 1A:
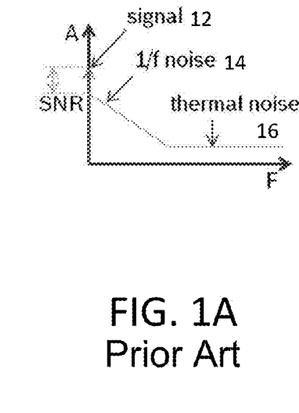
FIGS. 1A-1C are graphs that illustrate a known modulation scheme including a noise component for filtering noise from a signal.
Figure 1B:
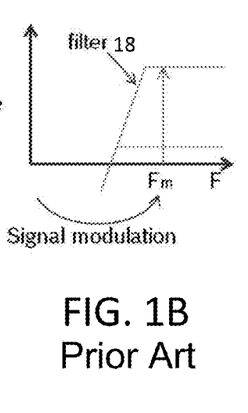
Figure 1C:
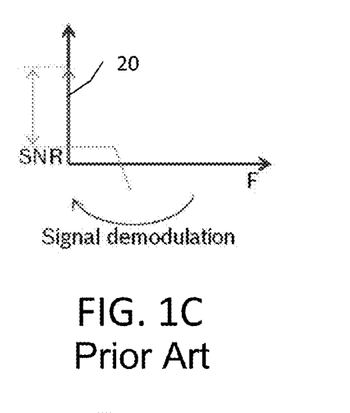

The output voltage is a combination of signals corresponding to the temperature change as well as offset, drift, and noise components. The noise component can include flicker ("1/f") noise and thermal noise. FIGS. 1A-1C illustrates a conventional method of compensating for signal noise components. FIG. 1A is a graph illustrates that a signal 12 corresponding to an output voltage resulting from a probe current comprises noise components including 1/f noise 14 and thermal noise 16. Generally, such noise is compensated for by modulating the signal 12 to a higher frequency band, subjecting the modulated signal to a high-pass filter 18, as illustrated in the graph of FIG. 1B, and by returning the signal 20 back to a base band through demodulation as illustrated in the graph of FIG. 1C. As illustrated in FIGS. 1A-C, a signal-to-noise ratio ("SNR") increases as a result of the modulation and demodulation scheme.

However if noise, such as flicker noise or low frequency drift noise, is embedded in the bolometer, conventional modulation is insufficient to compensate for the noise components. What is needed, therefore, is a method of modulating a bolometer that can compensate for a noise source embedded in the bolometer.

SUMMARY

In order to facilitate detection of radiation, in particular radiation in a long wavelength infrared window (8 μm-12 μm) and a mid-wavelength infrared window (3 μm-5 μm), a semiconductor sensor system includes an electrode supported the substrate, an absorber structure suspended over and spaced apart from the electrode, a voltage source operatively coupled to the electrode and the absorber structure, and a current source operatively coupled to the absorber structure.

The absorber structure includes an absorbing material and a thermistor. The electrode may operate as a mirror that reflects radiation back toward the absorber structure. The sensor system may also include a mirror separate from the electrode that can positioned between the electrode and the substrate, above the absorber structure, next to the electrode, or any other acceptable position. The mirror reflects incident radiation back toward to absorber structure to be absorbed by the absorber material.

The absorber material's ability to absorb radiation of different wavelengths, i.e., the absorber material's sensitivity, is based at least in part upon a height of a gap between the absorber structure and the mirror, where the height of the gap is associated with a wavelength of radiation to be detected by the system.

A temperature of the absorbing material changes due to the absorption of radiation by the absorbing material. The thermistor is thermally coupled to the absorber material so that a temperature of the thermistor changes along with the temperature of the absorber material. The thermistor has a resistance that varies along with the temperature of the thermistor.

The current source applies a probe current across the absorber structure, in particular across the thermistor, to enable a detection of a change in the resistance of the thermistor that may be used as a detection signal to make an inference about the radiation absorbed by the absorbing material.

The voltage source is operatively coupled to the electrode, and is configured to supply the electrode with power to produce a modulated electric potential that produces an electrostatic force that acts on the absorber structure to modulate a minimum height of the gap.

The electric potential has a DC component that adjusts the height of the gap to be associated with a wavelength of radiation to be detected by the system. The electric potential also has an AC component that drives the absorber structure with a carrier frequency. The carrier frequency may be based at least in part upon a thermal time constant of the absorber structure as well as a mechanical transfer function for the resiliency of the absorber structure that counteracts the action of the electric potential.

The cyclical repositioning of the absorber structure due to the carrier frequency results in a cyclical adjustment of the height of the gap and a corresponding cyclical adjustment of the absorption efficiency of the absorber material, which introduces an AC component into the detection signal. The AC component in the detection signal negatively interferes with noise embedded in the sensor device, such as thermal noise and flicker noise.

In one embodiment, the sensor system includes a second absorber structure and a second electrode that form a differential pair with the absorber structure and electrode. The voltage source supplies the second electrode with power to produce a second electric field. However, the sensor system in this embodiment further includes an inverter that phase shifts the AC component by 180 degrees relative to the AC component of the electric potential of the electrode. A potential difference in detection signals from the first absorber structure and second absorber structure forms a differential detection signal of the sensor system.

A filter, such as a high pass filter, may be used to isolate components of the detection signal that are indicative of the radiation absorbed by the absorber material and to filter out low frequency noise and thermal drift. The filter may be based on the carrier frequency of the AC component of the electric potential, as well as the mechanical transfer function of the absorber structure. The filtered detection signal may then be brought back to base band frequency through demodulation.

In an embodiment, a free standing bolometer includes an absorber and a mirror/electrode, and is configured to be electrostatically actuated.

In one embodiment, the mirror/electrode is below the absorber. In another embodiment, the mirror/electrode is above the absorber.

In a further embodiment, a signal modulation scheme for a bolometer comprises gap variation between an absorber and a mirror/electrode, wherein the gap variation is configured to cause constructive or destructive interference, for example, in order to compensate for noise such as flicker noise and thermal noise.

In another embodiment, a bolometer includes a sensor, wherein a mirror/electrode of the sensor is supplied with an AC voltage overlaid with a DC component.

In an additional embodiment, a bolometer includes a first sensor and a second sensor that form a differential pair, wherein a mirror/electrode of the first sensor is supplied with an AC voltage overlaid with a DC component that is phase shifted by 180 degrees from an AC voltage overlaid with a DC component that is supplied to the second sensor.

In an embodiment, a micro-electromechanical systems (MEMS) bolometer system includes a substrate, a first absorber structure, a first electrode, and a voltage source. The first absorber structure is spaced apart from the substrate by a first gap. The first electrode is supported by the substrate and is spaced apart from the first absorber. The voltage source is operatively coupled to the first electrode and is configured to generate a first modulated electrostatic force on the first absorber structure using the first electrode such that a minimum height of the first gap above the substrate is modulated by the first modulated electrostatic force.

In one embodiment, a first modulated electrostatic force generated by a voltage source of a MEMS bolometer system includes a DC component and an AC component.

In another embodiment, a MEMS bolometer system includes a mirror supported by a substrate at a location aligned with at least a portion of a first absorber structure.

In a further embodiment, a mirror of a MEMS bolometer system is located between a first electrode and at least a portion of a first absorber structure.

In an embodiment, a first electrode of a MEMS bolometer system includes a mirror supported by a substrate at a location aligned with at least a portion of a first absorber structure.

In one embodiment, a MEMS bolometer system includes a second absorber, a second electrode, and an AC inverter. The second absorber structure is spaced apart from the substrate by a second gap. The second electrode is supported by the substrate and is spaced apart from the second absorber. The AC inverter has an output operatively coupled with the second electrode, and is configured to generate a second modulated electrostatic force on the second absorber structure using the second electrode such that a minimum height of the second gap is modulated by the second modulated electrostatic force. A phase of a first modulated electrostatic force of the MEMS bolometer system is shifted by 180 degrees from a phase of the second modulated electrostatic force.

In another embodiment, a first absorber structure of a MEMS bolometer system has a mechanical reaction time and a thermal time constant, and an AC component of an electrostatic force generated by a voltage source of the MEMS bolometer system has an AC component. A maximum frequency of the AC component is based upon the mechanical reaction time and the thermal time constant.

In a further embodiment, a MEMS bolometer system includes a high pass filter operatively connected to an absorber structure, and a demodulator operatively connected to an output of the high pass filter.

In an additional embodiment, a method of operating a MEMS bolometer system includes spacing a first absorber structure apart from a substrate by a first gap, generating a first modulated electrostatic force on the first absorber structure using a first electrode supported by the substrate and spaced apart from the first absorber structure, and modulating a minimum height of the first gap above the substrate using the first modulated electrostatic force.

In an embodiment, a method of operating a MEMS bolometer system includes generating a first modulated electrostatic force using a DC component and an AC component.

In one embodiment of a method of operating a MEMS bolometer system, spacing a first absorber structure apart from a substrate by a first gap includes selecting a distance associated with a local maximum or minimum of a mean normalized absorption of the first absorber structure for a wavelength of interest, and spacing the first absorber structure apart from the substrate by the selected distance.

In another embodiment of a method of operating a MEMS bolometer system, modulating a minimum height of a first gap between an absorber structure and a substrate includes using a DC component of an electrostatic force to bias the first absorber structure from a first location associated with a selected distance to a second location closer to the substrate such that a first variation of the mean normalized absorption of the first absorber structure for a given change in the minimum height of the first gap at the second location is greater than a second variation of the mean normalized absorption of the first absorber structure for the given change in the minimum height of the first gap at the first location.

In a further embodiment of a method of operating a MEMS bolometer system, spacing a first absorber structure apart from a substrate by a first gap includes spacing the first absorber structure apart from a mirror supported by the substrate at a location aligned with the mirror.

In an additional embodiment, a method of operating a MEMS bolometer system includes positioning a mirror at a location between a first electrode and at least a portion of a first absorber structure.

In a further embodiment of a method of operating a MEMS bolometer system, a first electrode includes a mirror supported by a substrate at a location aligned with at least a portion of the first absorber structure.

In an additional embodiment, a method of operating a MEMS bolometer system includes spacing a second absorber structure apart from a substrate by a second gap, generating a second modulated electrostatic force on the second absorber structure using a second electrode supported by the substrate and spaced apart from the second absorber structure, the generating using the DC component and a further AC component that is phase shifted by 180 degrees relative to an AC component of a first modulated electrostatic force, and modulating a minimum height of the second gap above the substrate using the second modulated electrostatic force.

In one embodiment, a method of operating a MEMS bolometer system includes isolating a signal indicative of radiation absorbed by a first absorber structure from a voltage in a first absorber structure via a high pass filter operatively connected to the absorber structure, and demodulating the signal via a demodulator operatively connected to an output of the filter.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 2:
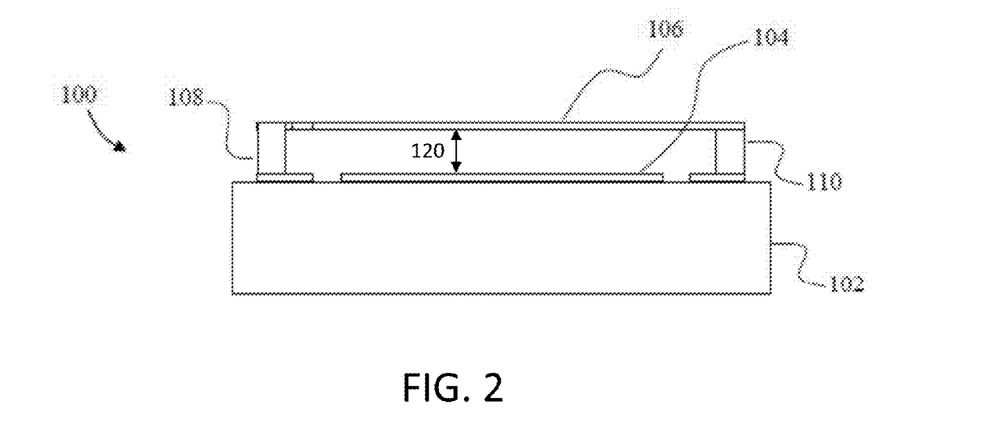
FIG. 2 depicts a side view of a bolometer with an absorber that provides the function of a thermistor in accordance with principles of this disclosure.

FIG. 2 depicts a side plan view of a semiconductor sensor 100 which in this embodiment is a bolometer. The sensor 100 includes a substrate 102, a mirror, 104 an absorber 106, and suspension legs 108 and 110.

The substrate 102 may be a complementary metal oxide semiconductor (CMOS) substrate or any other acceptable type of substrate. In this embodiment, the substrate 102 is a silicon wafer. While FIG. 2 illustrates only one sensor 100 formed on the substrate 102, the substrate 102 may include any acceptable number of sensors 100, and may include electronic circuitry usable to access an output of the sensor 100.

The mirror 104 is disposed on the substrate 102, and may be, for example, a metal reflector or a multilayer dielectric reflector. The absorber 106 is suspended over the mirror 104 by suspension legs 108 and 110 to form a gap between the absorber 106 and mirror 104. In this embodiment, the minimum height of the gap between the mirror 104 and the absorber 106 is about 2.5 μm. Since the efficiency of the absorber 106 for absorbing different wavelengths of radiation is related to the gap, the gap is selected to optimize absorption in a wavelength region to be sensed. In this embodiment, the 2.5 μm height of the gap is associated with the long-wavelength infrared region.

The absorber 106, in addition to absorbing energy from incident photons, is selected to provide a good noise-equivalent temperature difference (NETD). In order for the absorber 106 to have a good NETD, the material selected to form the absorber 106 should exhibit a high temperature coefficient of resistance while exhibiting low excess noise (1/f noise). Semiconductor materials such as vanadium oxide are common in micro-machined bolometers due to their high temperature coefficient of resistance. While metals have a lower temperature coefficient of resistance than some semiconductor materials, such as vanadium oxide, metals typically have much lower excess noise than many semiconductor materials.

Accordingly, in this embodiment the absorber 106 comprises metal. Titanium and Platinum are two metals which exhibit desired characteristics. Titanium, for example, exhibits a bulk resistivity of about 7*10-7 Ohm. Using a bulk resistivity of 7*10-7 Ohm, the thickness of the absorber 106 to match the impedance of free-space Y (377 Ohm/square meter) should be about 1.9 nm. The resistivity of materials formed to a thickness less than about 50 nm, however, can be several times higher than the bulk value. Accordingly, depending on process parameters, the thickness of the absorber 106, if made from titanium, is preferably about 10 nm. Impurities can also be introduced into the absorber 106 during formation in order to tune the resistivity if needed.

Consequently, the thickness of the absorber 106 in this embodiment is about 10 nm and the length of the absorber 106 from the suspension leg 108 to the suspension leg 110 is about 25 μm. This configuration provides a ratio between the thickness of the absorber 106 and the length of the absorber 106 in the order of 1/1000 and the ratio of the thickness of the absorber 106 to the gap height of about 1/100.

Other aspects of a bolometer device such as the embodiment illustrated in FIG. 2 are described in U.S. Pat. No. 7,842,533, granted Nov. 30, 2010, the disclosure of which is incorporated herein by reference in its entirety. Where a definition or use of a term in a reference is inconsistent or contrary to the definition of that term provided herein, the definition of that term provided herein applies and the definition of that term in the reference does not apply.

In the embodiment illustrated in FIGS. 2-4, the mirror 104 is additionally configured as an electrode, although in some embodiments, a separate electrode is provided, either above or below the mirror 104.

Figures 3A, 3B:
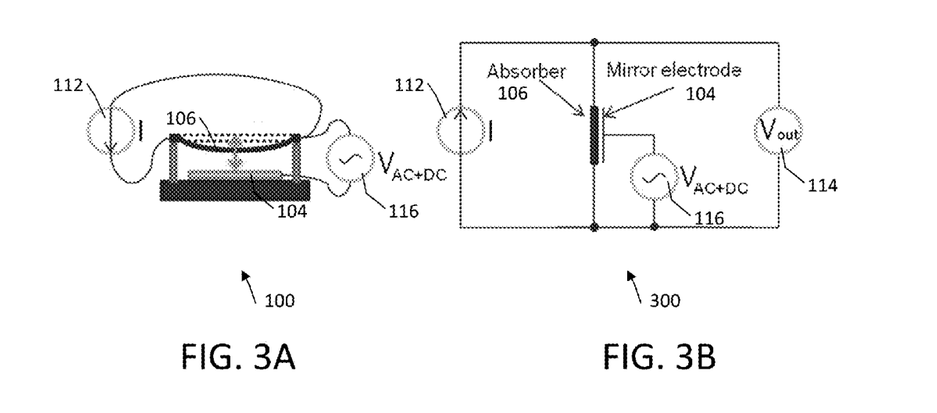
FIG. 3A depicts a side plan view of the bolometer of FIG. 2 along with a partial electrical schematic of the bolometer.
FIG. 3B depicts an electrical schematic of the bolometer of FIG. 2.

As illustrated in FIGS. 3A and 3B, the electronic schematic 300 of the sensor 100 includes a DC current source 112, and an output voltage 114. The DC current source 112 supplies the absorber 106 with a current, in particular, a probe current. The output voltage 114 reflects a resistance change in the absorber 106 due to absorption of incident radiation, and thus corresponds to a detector signal of the sensor 100.

The detector signal of the sensor 100 is modulated by the mirror/electrode 104 in order to compensate for noise components embedded in the sensor 100 using the electronic schematic 300. The mirror/electrode 104 is configured to create an electric potential between the electrode 104 and the absorber 106 which exerts an electrostatic force that repositions the absorber 106. A voltage source 116 powers the mirror/electrode 104, and thus drives the electric potential. The voltage source 116 has a DC component configured to modulate or modify a position of the absorber 106 and an AC component configured to drive the absorber 106 with a carrier frequency.

Figure 4:
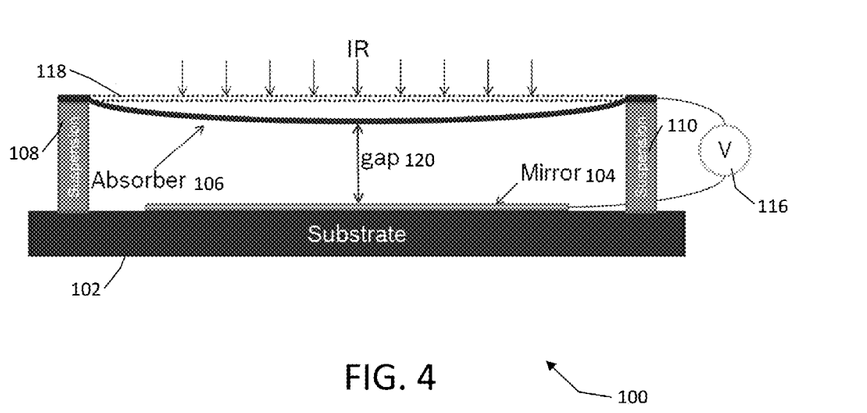
FIG. 4 depicts a side plan view of the bolometer depicted in FIG. 2, wherein the absorber is in a modulated position.

FIG. 4 depicts a side plan view of the sensor 100, in which the voltage source 116 is powering the mirror/electrode 104 with the DC component. The DC component drives an electric potential between the mirror/electrode 104 and the absorber 106. The electric potential exerts an electrostatic force that repositions the absorber 106 such that the absorber 106 is in a modified position relative to a rest position 118. In other words, the electrostatic force acts on the absorber 106 to change a minimum distance of a gap 120 between the absorber 106 and the mirror/electrode 104. The rest position 118 corresponds to a position of the absorber 106 when the DC component of the voltage source 116 is 0 V.

While the electrostatic force acts on the absorber 106, a spring force, i.e. a resiliency, of the absorber 106 counteracts the electrostatic force, such that actuation of the absorber 106 is based upon the electrostatic force and a mechanical transfer function of a structure of the absorber 106 and the mirror/electrode 104. In other words, an extent to which the absorber 106 is repositioned is based at least in part upon the voltage source 116 that powers the mirror/electrode 104, but also upon mechanical properties of the absorber 106, the mirror/electrode 104, and other structure of the sensor 100.

For different minimum heights of the gap 120, the sensor 100 exhibits different absorption efficiencies for various wavelengths of radiation. Thus, an absorption efficiency of the absorber 106 is modulated by modifying the minimum distance of the gap 120 using the mirror/electrode 104.

Figure 5:
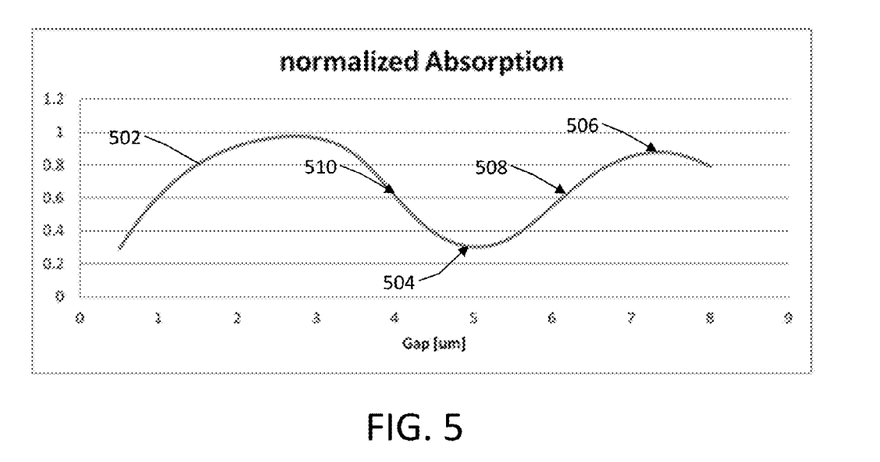
FIG. 5 is a graph of simulation data illustrative of absorption vs. a varying gap between the absorber and the mirror in the bolometer depicted in FIG. 2.

FIG. 5 illustrates a graph 502 of simulation data of a mean normalized absorption of radiation by the absorber 106 due to variation of the gap 120. The rest position 118 is selected to correspond to a point on the graph 502 that is close to a local maximum or minimum of the mean normalized absorption. In one embodiment, the minimum distance between the mirror and the absorber in the rest position is about 5 μm, corresponding to a local minimum 504, or, in another embodiment, the minimum distance between the mirror and the absorber in the rest position is about 7 μm, corresponding to a local maximum 506.

When the rest position 118 is at a point on the graph close to a local minimum or maximum, the DC component of the voltage source 116 modulates the absorption efficiency of the absorber 106 to a point on the graph 502 having a higher slope relative to a local minimum or maximum. In one embodiment, the DC component modulates a minimum height of the gap 120 from about 7 μm, corresponding to the local maximum 506, to a height of about 6 μm corresponding to the point 508. In another embodiment, the DC component modulates a minimum height of the gap 120 from about 5 μm, corresponding to the local minimum 504, to a height of about 4 μm corresponding to the point 510.

Because the points 508 and 510 on the graph 502 have a high slope relative to a local minimum or maximum, the carrier frequency of the AC component, when overlaid on the DC component, will have a greater effect on the absorption efficiency of the absorber 106. The output signal resulting from the probe current of the DC current source 112 will exhibit an AC component resulting from the AC component of the voltage source 116. A maximum actuation frequency for the carrier frequency depends at least in part upon a thermal time constant of the absorber 106 and a mechanical reaction time of the absorber 106. The resulting output of the sensor 100 can be filtered using a high pass filter in a manner similar to the modulation described with regard to the middle graph of FIGS. 1A-C above.

Figure 6:
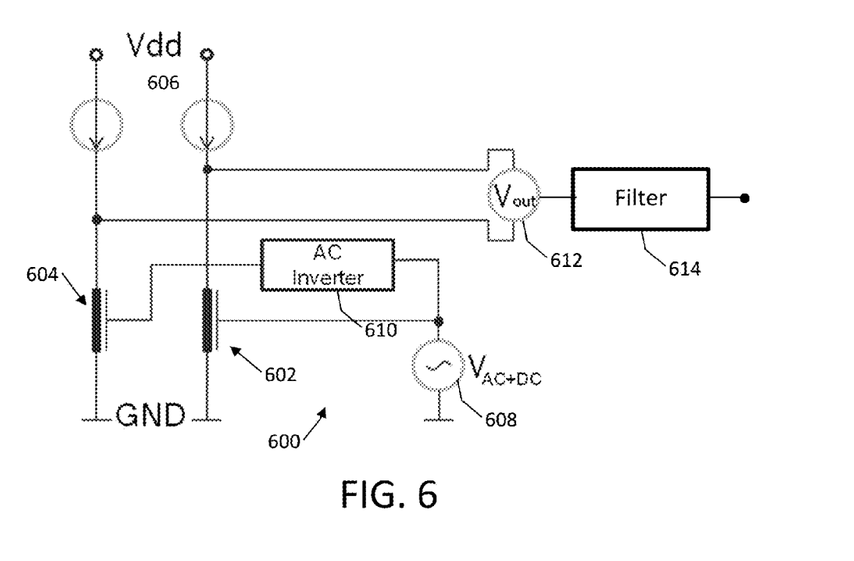
FIG. 6 depicts an electronic schematic of a multi-sensor bolometer according to this disclosure.

FIG. 6 depicts a circuit diagram of a sensor system 600 which, in this embodiment is a multi-sensor bolometer. The system 600 includes a plurality of sensors, in this embodiment a first sensor 602 and a second sensor 604, a DC current source 606, a voltage source 608, an inverter 610, and a filter circuit 614, where each sensor 602 and 604 includes an absorber structure and electrode.

The DC current source 606 supplies the first sensor 602 and the second sensor 604 with a DC current, in particular, a probe current. The voltage source 608 supplies each of the first sensor 602 and the second sensor 604 with a DC current component, supplies the first sensor 602 with a first AC current component, and supplies the second sensor 604 with a second AC current component that is phase shifted 180 degrees by the inverter 610.

Outputs of the first sensor 602 and second sensor 604 are compared to form an output voltage 612. The first sensor 602 and the second sensor 604 thus form a differential pair. The output voltage 612 is modulated by a carrier frequency of the voltage source 608 and modified by mechanical transfer functions of the first sensor 602 and the second sensor 604.

The filter circuit 614 acts on the output voltage, and includes a high pass filter and a demodulator, which operate in a manner similar to the modulation described with regard to the middle graph of FIGS. 1A-C above to isolate components of the detection signal that are indicative of the radiation absorbed by the absorber material and to filter out low frequency noise and thermal drift and return the resulting filtered signal back to base band frequency through demodulation.

While the above embodiments have been described with reference to detection of infrared radiation using a bolometer, the reader should appreciate that the above-described tool is not limited to infrared radiation. A bolometer according to the present disclosure can be configured for other types of detection, for example detecting particles, gravity waves, microwaves, and far-infrared radiation. Additionally, while various embodiments have been described above, the present disclosure is not limited to such embodiments. Other embodiments include one or more features described above.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A micro-electromechanical systems (MEMS) bolometer system, comprising:
    a substrate;
    a first absorber structure spaced apart from the substrate by a first gap;
    a first electrode supported by the substrate and spaced apart from the first absorber structure; and
    a voltage source with a DC component and an AC component, the AC component having a frequency selected to compensate for noise embedded within the system, the voltage source operatively coupled to the first electrode and configured to generate a first modulated electrostatic force on the first absorber structure using the first electrode such that a minimum height of the first gap above the substrate is modulated by the first modulated electrostatic force.

2. The MEMS bolometer system of claim 1, further comprising:
    a mirror supported by the substrate at a location aligned with at least a portion of the first absorber structure.

3. The MEMS bolometer system of claim 2, wherein the mirror is located between the first electrode and the at least a portion of the first absorber structure.

4. The MEMS bolometer system of claim 1, wherein the first electrode comprises a mirror supported by the substrate at a location aligned with at least a portion of the first absorber structure.

5. The MEMS bolometer system of claim 1, wherein:
    the first absorber structure has a mechanical reaction time;
    the first absorber structure has a thermal time constant;
    the AC component has a maximum frequency; and
    the maximum frequency is based upon the mechanical reaction time and the thermal time constant.

6. The MEMS bolometer system of claim 1, further comprising:
    a high pass filter operatively connected to the absorber structure; and
    a demodulator operatively connected to an output of the high pass filter.

7. A method of operating a micro-electromechanical systems (MEMS) bolometer system, comprising:
    spacing a first absorber structure apart from a substrate by a first gap;
    selecting an AC frequency that compensates for noise embedded in the system;
    generating a voltage with a DC component and an AC component, the AC component having the selected frequency;
    applying the voltage to a first electrode supported by the substrate and spaced apart from the first absorber structure to generate a first modulated electrostatic force on the first absorber structure using a first electrode; and
    modulating a minimum height of the first gap above the substrate using the first modulated electrostatic force.

8. The method of claim 7, wherein spacing the first absorber structure apart from the substrate by the first gap comprises:
selecting a distance associated with a local maximum or minimum of a mean normalized absorption of the first absorber structure for a wavelength of interest; and
spacing the first absorber structure apart from the substrate by the selected distance.

9. The method of claim 8, wherein modulating the minimum height of the first gap comprises:
using the DC component to bias the first absorber structure from a first location associated with the selected distance to a second location closer to the substrate such that a first variation of the mean normalized absorption of the first absorber structure for a given change in the minimum height of the first gap at the second location is greater than a second variation of the mean normalized absorption of the first absorber structure for the given change in the minimum height of the first gap at the first location.

10. The method of claim 9, wherein spacing the first absorber structure apart from the substrate by the first gap comprises:
spacing the first absorber structure apart from a mirror supported by the substrate at a location aligned with the mirror.

11. The method of claim 10, further comprising:
positioning the mirror at a location between the first electrode and the at least a portion of the first absorber structure.

12. The method of claim 9, wherein the first electrode comprises a mirror supported by the substrate at a location aligned with at least a portion of the first absorber structure.

13. The method of claim 7, further comprising:
spacing a second absorber structure apart from the substrate by a second gap;
generating a second modulated electrostatic force on the second absorber structure using a second electrode supported by the substrate and spaced apart from the second absorber structure, the generating using the DC component and a further AC component that is phase shifted by 180 degrees relative to the AC component; and
modulating a minimum height of the second gap above the substrate using the second modulated electrostatic force.

14. The method of claim 7, wherein:
the first absorber structure has a mechanical reaction time;
the first absorber structure has a thermal time constant;
the AC component has a maximum frequency; and
the maximum frequency is based upon the mechanical reaction time and the thermal time constant.

15. The method of claim 7, further comprising:
isolating a signal indicative of radiation absorbed by the first absorber structure from a voltage in the first absorber structure via a high pass filter operatively connected to the absorber structure; and
demodulating the signal via a demodulator operatively connected to an output of the filter.

* * * * *